US012585536B2

(12) United States Patent
      Clauss

(10) Patent No.:    US 12,585,536 B2
(45) Date of Patent:      Mar. 24, 2026

(54) MEMORY SYSTEM

(71) Applicant: STMicroelectronics International N.V., Geneva (CH)

(72) Inventor: Raphael Clauss, St Egreve (FR)

(73) Assignee: STMicroelectronics International N.V., Geneva (CH)

( * ) Notice: Subject to any disclaimer, the term of this patent is extended or adjusted under 35 U.S.C. 154(b) by 62 days.

(21) Appl. No.: 18/798,040

(22) Filed: Aug. 8, 2024

(65) Prior Publication Data

US 2025/0053478 A1      Feb. 13, 2025

(30) Foreign Application Priority Data

Aug. 9, 2023      (FR) .................................. FR2308604

(51) Int. Cl.
*G06F 11/10*            (2006.01)
(52) U.S. Cl.
CPC ................................ *G06F 11/1044* (2013.01)
(58) Field of Classification Search
CPC ............. G06F 11/1044; G06F 11/1016; G06F 11/1048; G11C 7/1006; G11C 29/42
See application file for complete search history.

(56) References Cited

U.S. PATENT DOCUMENTS

| | | | |
|---|---|---|---|
| 2007/0011590 A1 | 1/2007 | Chen | |
| 2011/0225475 A1* | 9/2011 | Kumar | G11C 8/16 |
| | | | 714/763 |
| 2018/0143871 A1* | 5/2018 | Shinbashi | H03M 13/095 |

FOREIGN PATENT DOCUMENTS

| | | |
|---|---|---|
| EP | 1126368 A2 | 8/2001 |
| EP | 3790014 A1 | 3/2021 |

OTHER PUBLICATIONS

INPI Search Report and Written Opinion for priority application, FR Appl. No. 2308604, report dated Apr. 5, 2024, 9 pgs.

* cited by examiner

*Primary Examiner* — Thien Nguyen
(74) *Attorney, Agent, or Firm* — Crowe & Dunlevy LLC

(57)                      ABSTRACT
A memory system includes a memory with memory blocks. A first logic circuit performs an XOR combinational logic function of a current value of a data addressing mode and of at least one bit of a first data packet including an error correction code of a data element to be written. A second data packet, generated by the first logic circuit, is stored into one of the memory blocks. A second logic circuit performs an XOR combinational logic function of at least one bit of the second packet (such as read from one of the memory blocks) and of the current value of the addressing mode. A weight of the bit of the first data packet corresponds to a weight of the at least one bit of the second read data packet.

22 Claims, 5 Drawing Sheets

130

106    104
105

Data WR in    Data WR TO mem

ECC
encoder

ECC WR TO mem 114    206

Data RD in    Data RD from mem

ECC
decoder

ECC Error    ECC RD from mem 216    103

MEMORY

Start
502

Provide word comprising ECCin from
Data to write
504

XOR one or more bits of the word
with   address   mode value md
506

Store word resulting from XOR
operation in memory
508

XOR one or more bits of read word
with   address   mode value md
510

MEMORY SYSTEM

PRIORITY CLAIM

This application claims the priority benefit of French Application for Patent No. 2308604, filed on Aug. 9, 2023, the content of which is hereby incorporated by reference in its entirety to the maximum extent allowable by law.

TECHNICAL FIELD

The present disclosure generally concerns memory systems and methods implemented by these memory systems.

BACKGROUND

Many applications use memory systems to implement data storage in volatile or non-volatile memories. These systems may implement a plurality of linear or interleaved modes of data addressing into the different memory blocks. Successive changes of the addressing mode may however result, in certain conditions, in a decrease in the security of the stored data.

There exists a need to obtain memory systems enabling to keep the stored data secure during a change of addressing mode. There is a need to overcome all or part of the disadvantages of known memory systems.

SUMMARY

An embodiment provides a memory system comprising: a memory comprising memory blocks; a first logic circuit configured to perform an XOR combinational logic function of a current value of a data addressing mode and of at least one bit of a first data packet comprising an error correction code of a data element to be written or said data element to be written or said error correction code of a data element to be written and said data element to be written; a second data packet, resulting from the first logic circuit, being stored in one of the memory blocks; and a second logic circuit configured to perform an XOR combinational logic function of at least one bit of the second packet such as read from said one of the memory blocks and of the current value of the addressing mode during the reading of the second packet or subsequently thereto, a weight of said at least one bit of the first data packet corresponding to a weight of said at least one bit of the second read data packet.

An embodiment provides a method of securing a memory system, the system being provided with a memory comprising memory blocks, the method comprising: performing, with a first logic circuit, an XOR combinational logic function of a current value of a data addressing mode and of at least one bit of a first data packet comprising an error correction code of a data element to be written or said data element to be written or said error correction code of a data element to be written and said data element to be written; storing, into one of the memory blocks, a second data packet resulting from the first logic circuit; performing, with a second logic circuit, an XOR combinational logic function of at least one bit of the second packet such as read from said one of the memory blocks and of the current value of the addressing mode during the reading of the second packet or subsequently thereto, a weight of said at least one bit of the first data packet corresponding to a weight of said at least one bit of the second read data packet.

In an embodiment, such a system or method further comprises an error correction code decoder configured to decode a third data packet resulting from the second logic circuit.

In an embodiment, such a system or method further comprises an error correction code encoder configured to calculate said error correction code associated with said data element to be written.

In an embodiment, the first logic circuit is configured to perform an XOR combinational logic function based on a bit of the first data packet; and the second logic circuit is configured to perform an XOR combinational logic function based on a bit of the second packet such as read from said one of the memory blocks; the weight of the bit of the first data packet corresponding to the respective weight of the bit of the second data packet after reading.

In an embodiment, the error correction code encoder and decoder are of self-encrypting device (SED) type.

In an embodiment, the first logic circuit is configured to perform an XOR combinational logic function based on two bits of the first data packet; and the second logic circuit is configured to perform an XOR combinational logic function based on two bits of the second packet such as read from said one of the memory blocks; the weight of said two bits of the first data packet corresponding to the respective weight of said two bits of the second data packet after reading.

In an embodiment, the error correction code encoder and decoder are of single error correcting, double error detecting (SECDED) type.

In an embodiment, the first logic circuit is configured to perform an XOR combinational logic function based on three bits of the first data packet; and the second logic circuit is configured to perform an XOR combinational logic function based on three bits of the second packet such as read from said one of the memory blocks; the weight of said three bits of the first data packet corresponding to the respective weight of said three bits of the second data packet after reading.

In an embodiment, the error correction code encoder and decoder are of double error correction, triple error detection (DECTED) type.

In an embodiment, if the error correction code decoder detects an error, then the memory system generates an error value.

In an embodiment, if the error correction code decoder detects two errors, then the system generates an error value.

In an embodiment, if the error correction code decoder detects three errors, then the memory system generates an error value.

In an embodiment, the value of the addressing mode corresponds to an interleaved mode or a linear mode of data writing into said memory blocks.

In an embodiment, the first data packet further comprises the data element to be written.

BRIEF DESCRIPTION OF THE DRAWINGS

The foregoing features and advantages, as well as others, will be described in detail in the rest of the disclosure of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the steps and elements that are useful for the understanding of the described embodiments have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following description, when reference is made to terms qualifying absolute positions, such as terms "edge", "back", "top", "bottom", "left", "right", etc., or relative positions, such as terms "above", "under", "upper", "lower", etc., or to terms qualifying directions, such as terms "horizontal", "vertical", etc., it is referred, unless specified otherwise, to the orientation of the drawings.

Unless specified otherwise, the expressions "about", "approximately", "substantially", and "in the order of" signify plus or minus 10%, preferably of plus or minus 5%.

Figure 1:
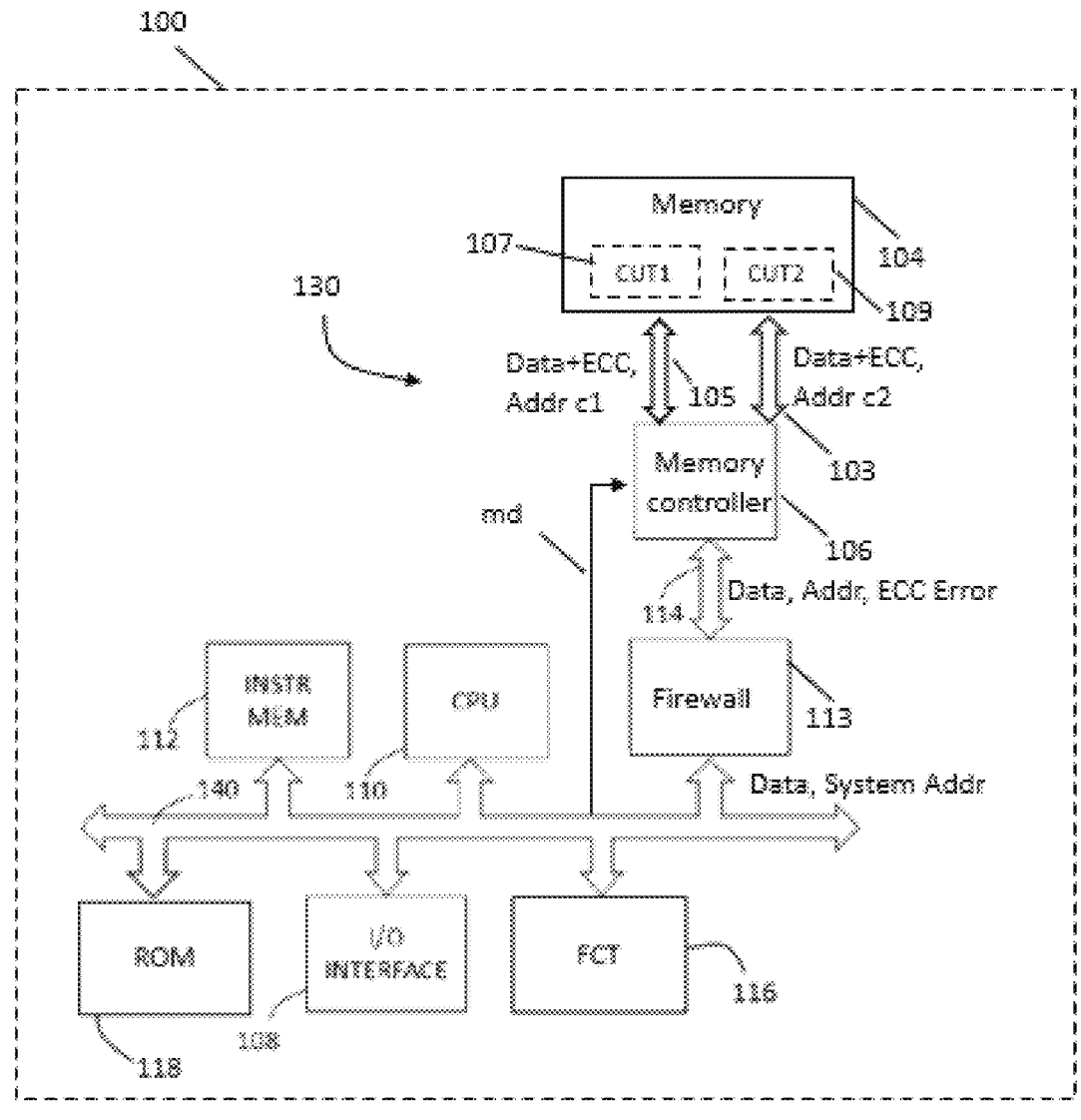
FIG. 1 shows an example of an integrated circuit of the type to which the described embodiments apply.

FIG. 1 shows an example of an integrated circuit of the type to which the described embodiments apply.

More precisely, FIG. 1 shows an example of an integrated circuit device 100 integrating a memory system 130. Memory system 130 integrates a volatile memory 104 (Memory), for example of RAM or non-volatile type, for example of FLASH type. Memory 104 for example comprises a plurality of memory blocks 107, 109 (CUT1, CUT2). Memory 104 is capable of communication, via one or a plurality of communication buses 103, 105, with driver circuit 106 (Memory controller) configured to write or read data into or from memory 104. In an example, bus 105 is dedicated to memory block 107, and bus 103 is dedicated to memory block 109. Buses 103 and 105 are, for example, gathered in a single bus.

Memory system 130 for example integrates memory controller 106, which comprises a dedicated hardware encoder circuit which, when it is activated, is configured to calculate an error correction code (ECC) during the writing of each element into one of memory blocks 107, 109. Communication buses 103, 105 are address buses for example, and buses for data packets comprising data to be written and their associated error correction code (Data+ECC, Addr c2 and Data+ECC, Addr c1 respectively). The memory controller implements, for example, a plurality of linear or interleaved addressing modes to write data into different memory blocks. Memory controller 106 receives, for example over bus 114 or over another bus, information (md), for example in the form of a bit, relative to the addressing mode to be used to write and/or read the data from the different memory blocks 107, 109.

Device 100 further comprises, for example, a processing unit 110 (CPU) comprising one or a plurality of processors under control of instructions stored in an instruction memory 112 (INSTR MEM). Instruction memory 112 is, for example, of random access type (RAM). Processing unit 110 and memory 112 communicate, for example, via a system bus 140 (data, address, and control). Memory controller 106 is, for example, coupled to system bus 140 via a firewall 113 and one or a plurality of communication buses 114. Communication bus 114 enables, for example, to exchange addresses, data, and data relative to errors on error correction codes (Data, Addr, ECC Error).

Firewall 113 protects the critical data by filtering them based on their address. The firewall processes, in collaboration with, for example, bus 140, data and system addresses (Data, System Addr).

Device 100 further comprises an input/output interface 108 (I/O INTERFACE) coupled to system bus 140 to communicate with the outside.

Device 100 may integrate other circuits implementing other functions (for example, one or a plurality of volatile and/or non-volatile memories, other processing units), symbolized by a block 116 (FCT) in FIG. 1.

Figure 2:
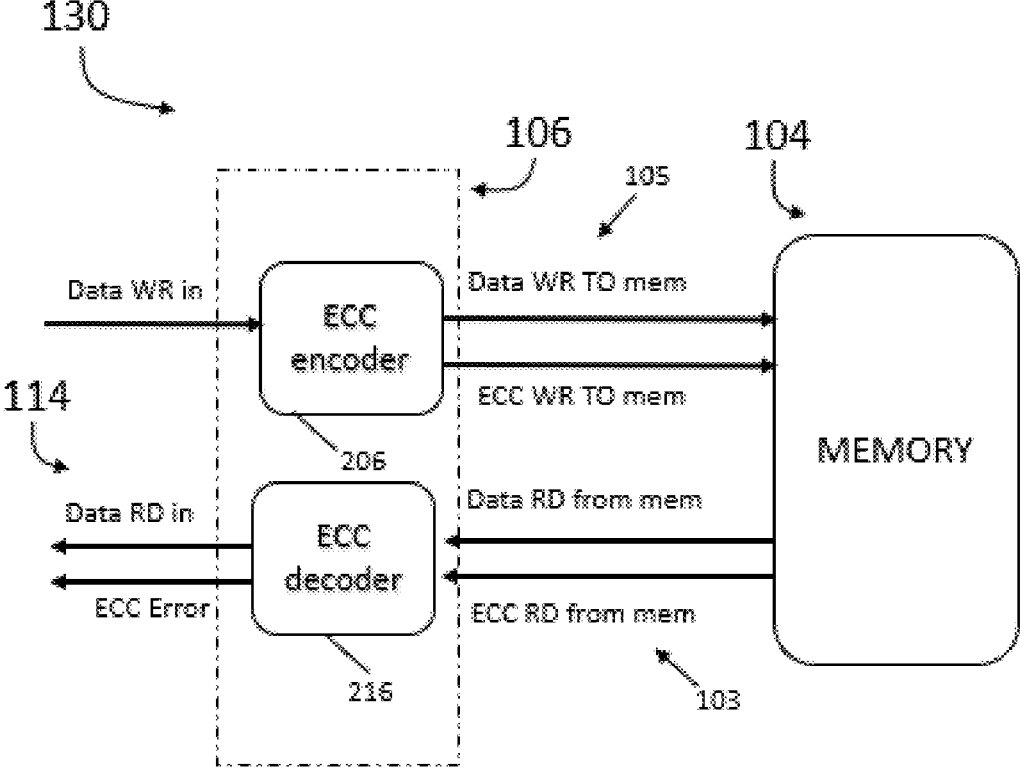
FIG. 2 illustrates an example of a memory system of the integrated circuit of FIG. 1.

FIG. 2 illustrates an example of a memory system 130 of the integrated circuit of FIG. 1.

In the shown example, the memory controller 106 of memory system 130 comprises an error correction code encoder circuit 206 (ECC encoder) configured to calculate an error correction code (ECC WR TO mem) associated with a data element to be written (Data WR in) supplied over bus 114 for example. Data element (Data WR TO mem), as well as its associated error correction code ECC WR TO mem, are supplied to bus 105, for example in the form of one or a plurality of data packets, to be written into memory 104. When the data element and its associated error correction code are arranged in a data packet, otherwise called word, they may be arranged in the ECC_Data form.

In an example, encoder and decoder 206, 216 apply a Hamming code or a Golay code.

In the shown example, the memory controller 106 of memory system 130 further comprises an error correction code decoder circuit 216 (ECC decoder) configured to decode the error correction code (ECC RD from mem) of the data packet (ECC RD from mem+Data RD from mem) originating from the reading of the data packet which had been previously written into memory 104. Decoder 216 raises, for example over bus 114, a flag (ECC Error) indicating that an error has been found in the read data packet and for example comprising the error correction code (ECC RD from mem) and the read data element (Data RD in).

Circuits 206 and 216 are, for example, hardware circuits.

In certain cases, there may occur that, during the memory writing of the data packet(s), one or a plurality of bits of the data packet are flipped (that is, for a bit of given weight, the inverse value is recorded) (phenomenon called bit flip). In this case, error correction code ECC may be used.

The error correction code may be used to correct one or a plurality of errors in a data packet read from the memory, during a decoding step.

There exist different types of error correction code: Single Error Detection (SED) is an error correction code only allowing the detection of one error per packet read from the memory. When an error is detected in the packet read from the memory, an error code or a zero value is returned. Single Error Correction and Double Error Detection (SECDED) is an error correction code enabling to correct one error and to detect up to two errors per data packet read from the memory. When two errors are detected in the packet read from the memory, an error code or a zero value is returned.

Double Error Correction and Triple Error Detection (DECTED) is an error correction code enabling to correct up to two errors and to detect up to three errors per data packet read from the memory. When three errors are detected in the packet read from the memory, an error code or a zero value is returned.

Thus, encoder and decoder 206, 216, when they are of SED type, allow the correction of a flipping of one bit of the data packet. When they are of SECDED type, they allow the correction of a flipping of one bit of the data packet and the detection of two bit modifications. When they are of DECTED type, they allow the correction of two bit flips and the detection of three bit modifications.

As a summary, for an encoder 206 and a decoder 216 of SECDED type, if a bit is flipped either in the error correction code, or in the read data element, then data element Data RD in is equal to data element Data WR in since the decoder has corrected the read data element or ECC code of the packet. If two bits are flipped, then data element Data RD in has switched to 0 and flag ECC Error is raised by the decoder. In the case where 3 bits or more are inverted, the result of decoder 216 is unpredictable.

Figure 3:
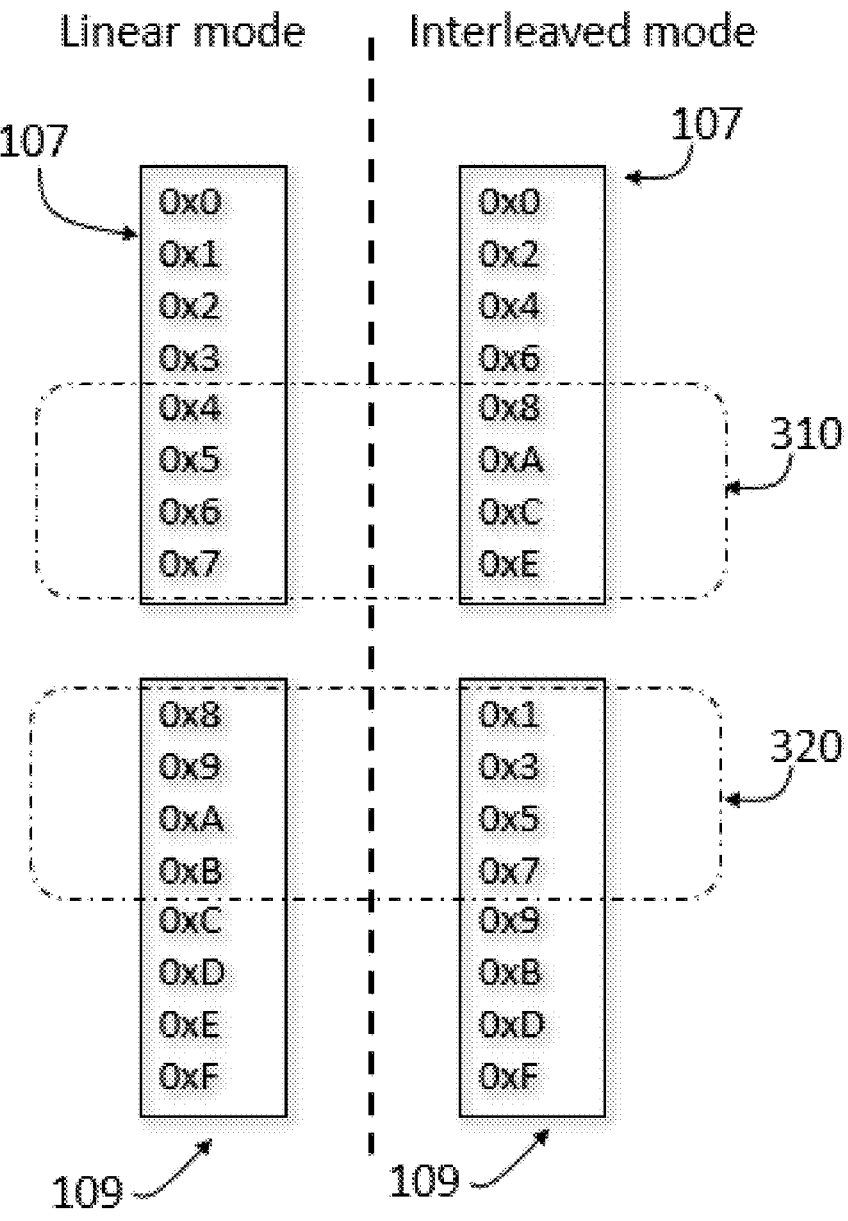
FIG. 3 illustrates an example of a memory of the integrated circuit of FIG. 1.

FIG. 3 illustrates an example of a memory 104 of the integrated circuit of FIG. 1.

More precisely, the example of FIG. 3 illustrates memory blocks 107 and 109 in the case where the addressing mode is of linear type (Linear mode) (case illustrated on the left-hand side) and in the case where the addressing mode is of interleaved type (case illustrated on the right-hand side).

In the case of the linear mode, memory block 107 is filled with data according to system addresses (System Addr) linearly incremented for example from 0x0 to 0x7. The data sequence is copied with system addresses 0x8 to 0xF in the same way.

In the case of the interleaved mode, the data are for example written with addresses incremented from two to two. In the shown example, the addresses in the first memory block 107 are 0x0, then 0x2, then 0x4 etc. all the way to 0xE and the addresses in the second memory block 109 are 0x1, then 0x3, then 0x5 etc. all the way to 0xF.

The firewall defines, in the shown example in linear mode, the data of the addresses 0x4, 0x5, 0x6, 0x7 of block 107 (area 310) and 0x8, 0x9, 0xA, 0xB to 0xB of block 109 (area 320) as being data to be secured, for example encryption keys.

During a change of addressing mode, for example passing from the linear addressing mode to the interleaved addressing mode, the system addresses are used differently in memory blocks 107 and 109.

For each addressing mode, secure address areas are defined and intended for the storage of secure data. Also, non-secure address areas are defined and intended for the storage of non-secure data.

Certain addresses may, in linear mode, form part of a secure address area and, in interleaved mode, form part of a non-secure address area.

In the shown example, addresses 0x4 and 0x6, as well as 0x9 and 0xB, are not contained in address areas 310 and 320 defining the secure data, while they are in linear mode. During the change of addressing mode, from a linear mode to an interleaved mode, addresses 0x4 and 0x6 as well as 0x9 and 0xB thus become accessible, so that a hacker could take advantage of this change of mode to access secure data.

To overcome these problems, it is possible to erase the memory blocks. However, this erasing requires a significant duration, particularly in the case of non-volatile memories. In another solution, the error correction code may be based on the data element and its address. This however requires an increase of hardware resources and impacts the execution speed. An alternative solution is to add an additional bit to store the addressing mode used during the write operation but this causes the increase in the size of memory 104.

The embodiments provide a memory system comprising a first logic circuit configured to perform an XOR combinational logic function (XOR) of current value of a data addressing mode and of at least one bit of a first data packet comprising an error correction code of a data element to be written, a second data packet, resulting from the first logic circuit, being stored in one of the memory blocks; and a second logic circuit configured to perform an XOR combinational logic function of at least one bit of the second packet such as read from said one of the memory blocks and of the current value of the addressing mode, during the reading of the second packet or subsequently thereto, a weight of said at least one bit of the first data packet corresponding to a weight of said at least one bit of the second data packet after reading.

Due to such a memory system, if the addressing mode changes (from a linear mode to an interleaved mode or conversely), between the writing of the data element to be written and its associated error correction code in the memory, and the reading of this data element with its error correction code, it is possible to detect, with the decoder, an error which will for example enable to forbid the access to the written data element. This further enables to make the secure data inaccessible during a change of the addressing mode and this, without increasing the memory size.

Indeed, if the addressing mode changes between the writing and the reading of the data element, and the value of the addressing mode is different, at least one error will be contained in the read data packet. In the case where the error correction code is of SED type, then an error detection flag will be raised, and during the reading an error code or a zero value will be returned.

When the error correction code is of another type, for example SECDED or DECTED, the logic circuits are then configured to perform operations over respectively two and three bits, so that an error code or a zero value is returned in case of a change of addressing mode between the writing and the reading.

The XOR operation is performed on a first packet, which may be the error correction code or the data to be written or a concatenation of the error correction code and of the data to be written.

Figure 4:
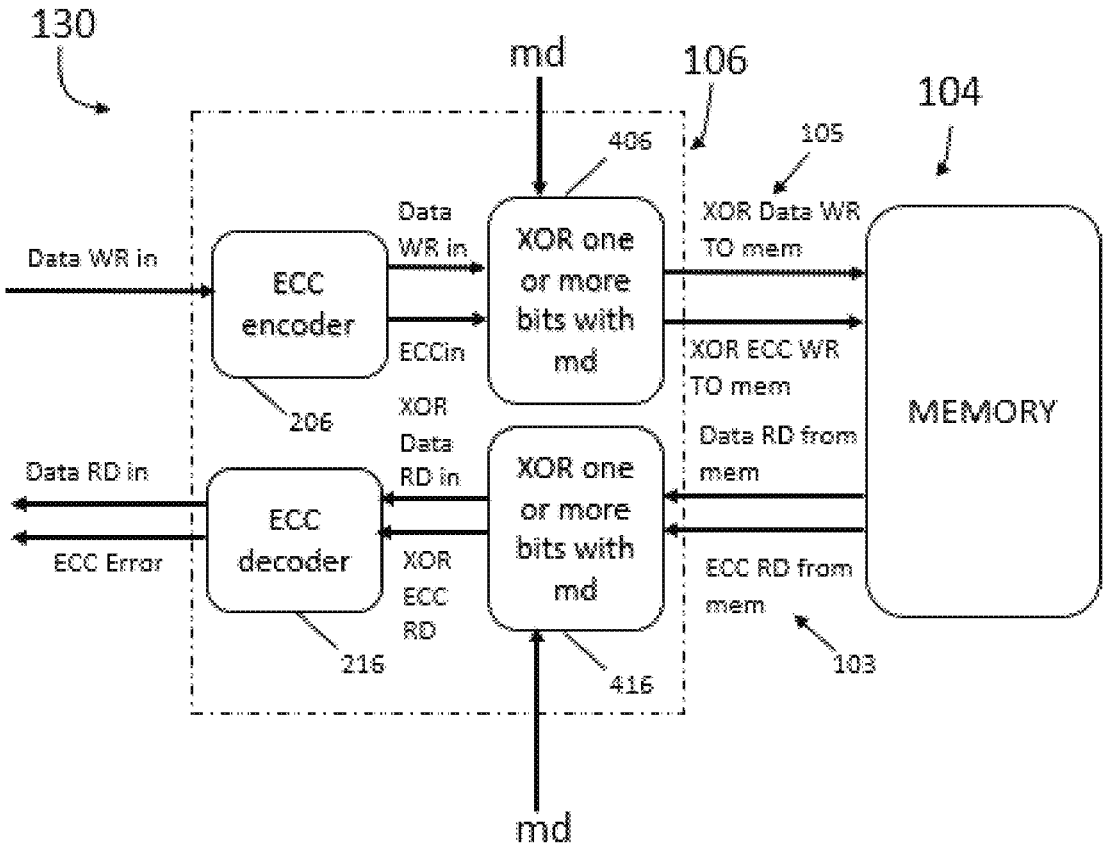
FIG. 4 illustrates an example of a memory system of the integrated circuit of FIG. 1 according to an embodiment.

FIG. 4 illustrates an example of a memory system 130 of the integrated circuit of FIG. 1 according to an embodiment.

The memory system of FIG. 4 is similar to that of FIG. 2 except that memory controller 106 comprises a first combinational logic circuit 406 (performing an exclusive-OR (XOR) logical combination of one or more bits with md) and a second combinational logic circuit 416 (performing an XOR logical combination of one or more bits with md) configured to perform an XOR combinational logic function (XOR) over at least one selected bit of those which are received as an input. In the case of encoders and decoders 206, 216 of SED type, then the XOR operation is applied to a single bit. In the case of encoders and decoders 206, 216 of SECDED type, then the XOR operation is applied to two selected bits. In the case of encoders and decoders 206, 216 of DECTED type then the XOR operation is applied to three selected bits. The selected bits, which will be submitted to the XOR operation, are either on the error correction code, or on the data element, or on both.

First logic circuit 406 performs the XOR combinational logic function based on the current value of addressing mode md, that is, value md at the time of encoding ECC or until the performing of the XOR operation. The XOR combinational logic function is also performed based on at least one bit of the data packet comprising the data element to be written Data WR in and its associated error correction code ECCin. The error correction code ECCin associated with the data element to be written Data WR in, is obtained with encoder 206.

As an illustration, in the case where encoder 206 and decoder 216 are of SECDED type, if ECCin=111 and Data WR in=0101 then the associated data packet is, for example, in the 111_0101 (or 0101_111) form. If the current addressing mode is, for example, interleaved and value 1 is arbitrarily associated with this mode, and if it is desired for the XOR combinational logic function of first logic circuit 406 to be applied to the least significant bit of ECCin 111 and the most significant bit of Data WR in 0101, then at the output of the first logic circuit, a data element XOR Data WR TO mem=1101 and an error correction code XOR ECC WR TO mem=110 are obtained. The data packet at the output of block 406 before the writing into one of the memory blocks then is 110_1101.

Data element XOR Data WR TO mem and code ECC, XOR ECC WR TO mem, resulting from logic circuit 406, are either separately supplied over bus 105 or supplied over bus 105 in the form of a data packet, for example in the 110_1101 form as in the previous example.

Data element XOR Data WR TO mem and code ECC, XOR ECC WR TO mem, are then stored into one of the memory blocks of memory 104.

This data element and its associated error code are then read and are then for example called Data RD from mem and ECC RD from mem.

The data element Data RD from mem and its associated error code ECC RD from mem which have been read are then used, for example in the form of a packet ECC RD from mem_Data RD from mem at the input of second logic circuit 416. Second logic circuit 416 then performs an XOR combinational logic function (XOR) of at least one bit of packet ECC RD from mem_Data RD from mem and of the current value of addressing mode md. Current value md corresponds to the value of the addressing mode during the reading of data element Data RD from mem and of its associated error code ECC RD from mem (or of the data packet formed by the latter), or subsequently to this reading, at the time to perform the XOR operation, for example.

The XOR combinational logic function is performed on the same bit(s) as those which have been used in first logic circuit 406. In other words, the operation of second logic circuit 406 applies to the bits of same weight as those used to apply the XOR combinational logic function to data element Data WR in and/or to ECCin.

Referring to the previous example of illustration, if the current addressing mode has been changed during or after the reading and becomes, for example, linear and value 0 is arbitrarily associated with this linear mode, the XOR combinational logic function of second logic circuit 416 is applied, for example, to the least significant bit of ECC RD from mem and the most significant bit of Data RD from mem, then, at the output of second logic circuit 416, a data element XOR Data RD in=1101 and error correction code XOR ECC RD=110 are obtained. XOR Data RD in and XOR ECC RD are, for example, arranged in an output data packet of block 416 and in the present example with the 110_1101 form.

Decoder 216 analyzes error correction code XOR ECC RD and data element XOR Data RD. At the output of decoder 216, if addressing mode md has not been changed between block 206 and block 416, and no write or read error occurs, flag ECC Error is not raised and data element Data RD in will be the same as Data WR in. If, however, as in the example of illustration, addressing mode md has been changed between block 206 and block 416, then the decoder will raise flag ECC Error—for example by switching it to 1—since error correction code XOR ECC RD and data element XOR Data RD are not consistent with each other. In this case, data element Data RD in is set to 0, for example, and an error of bus error type or a zero value is sent to processing unit 110. This enables to make the secure data inaccessible during a change of the addressing mode and this, without increasing the memory size.

Figure 5:
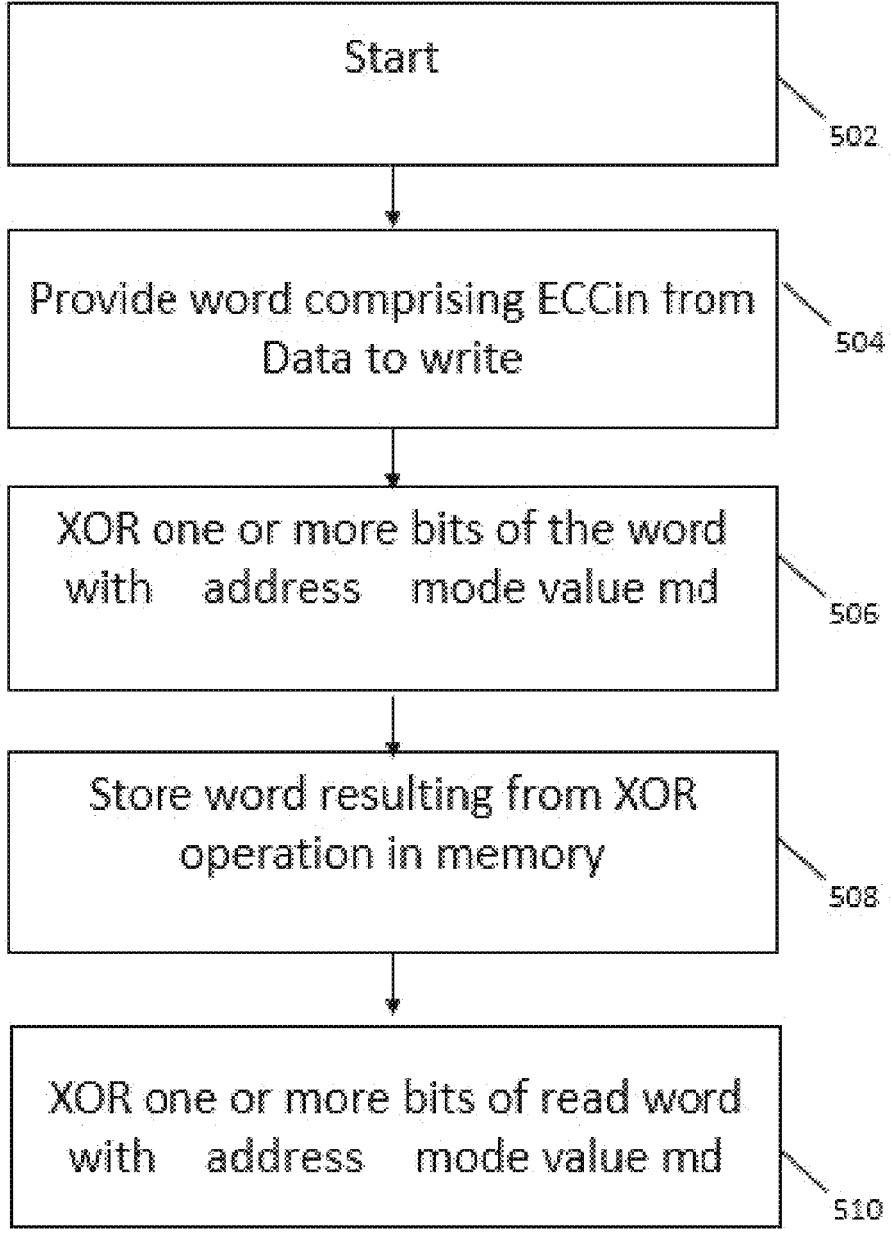
FIG. 5 illustrates a method of securing the memory system of FIG. 4 according to an embodiment.

FIG. 5 illustrates a method of securing the memory system of FIG. 4 according to an embodiment.

In this example, a first step 502 (Start) signals the starting of the securing method.

At a subsequent step 504 (Provide word comprising ECCin from Data to write), error correction code ECCin is calculated by encoder 206 based on the data element to be written Data WR in.

At a subsequent step 506 (XOR one or more bits of the word with address mode value md), there is performed an XOR combinational logic function XOR of the current value of the data addressing mode md and of at least one bit of a first data packet, for example in the ECCin_Data WR in form, comprising error correction code ECCin and the data element Data WR in to be written.

At a subsequent step 508 (Store word resulting from XOR operation in memory) a second data packet, for example in form XOR ECC WR TO mem_XOR Data WR TO mem, resulting from first logic circuit 406, is stored into one of memory blocks 107, 109.

At a subsequent step 510 (XOR one or more bits of read word with address mode value md), there is performed, with second logic circuit 416, an XOR combinational logic function XOR of at least one bit of the second packet such as read from said one of the memory blocks 107, 109, and of the current value of addressing mode md during the reading of the second packet or subsequently thereto. The weight of the bit(s) of the first data packet submitted to the XOR combinational logic function corresponds to a weight of the bit(s) of the second data packet submitted to the XOR combinational logic function after reading.

Various embodiments and variants have been described. Those skilled in the art will understand that certain features of these various embodiments and variants may be combined, and other variants will occur to those skilled in the art. In particular, the bit(s) on which the XOR operations are performed are for example only on codes ECCin and ECC RD from mem, or also only on data Data RD from mem and Data WR in.

Finally, the practical implementation of the described embodiments and variants is within the abilities of those skilled in the art based on the functional indications given hereabove. In particular, concerning the arrangement of the error correction code and of the corresponding data element, which may be processed, either in the form of a packet as in the example of illustration, or individually. Further, the number of bits implied in logic circuits 406 and 416 is a function of the SED, SECDED, DECTED type of encoding and of decoding. Besides, other types of codes, different from Hamming or Golay, may be used for the error correction code.

The invention claimed is:

1. A memory system, comprising:
a memory comprising memory blocks;
a first logic circuit configured to perform an XOR combinational logic function of a current value of a data addressing mode and of at least one bit of a first data packet comprising one of: an error correction code of a data element to be written; said data element to be written; or a combination of an error correction code of a data element to be written and said data element to be written;
wherein a second data packet output by the first logic circuit is stored in one of the memory blocks; and
a second logic circuit configured to perform an XOR combinational logic function of at least one bit of the second data packet read from said one of the memory blocks and of the current value of the addressing mode during the reading of the second packet or subsequently thereto;
wherein a weight of said at least one bit of the first data packet corresponds to a weight of said at least one bit of the second read data packet.

2. The system according to claim 1, further comprising an error correction code decoder configured to decode a third data packet resulting from the second logic circuit.

3. The system according to claim 2, further comprising an error correction code encoder configured to calculate said error correction code associated with said data element to be written.

4. The system according to claim 3, wherein:
the first logic circuit is configured to perform the XOR combinational logic function based on a bit of the first data packet; and
the second logic circuit is configured to perform the XOR combinational logic function based on a bit of the second packet such as read from said one of the memory blocks.

5. The system according to claim 4, wherein the error correction code encoder and decoder are of single error detection (SED) type.

6. The system according to claim 5, wherein if the error correction code decoder detects an error, then the memory system generates an error value.

7. The system according to claim 3, wherein:
the first logic circuit is configured to perform the XOR combinational logic function based on two bits of the first data packet; and
the second logic circuit is configured to perform the XOR combinational logic function based on two bits of the second packet such as read from said one of the memory blocks;
the weight of said two bits of the first data packet corresponding to the respective weight of said two bits of the second data packet after reading.

8. The system according to claim 7, wherein the error correction code encoder and decoder are of single error correction, double error detection (SECDED) type.

9. The system according to claim 8, wherein if the error correction code decoder detects two errors, then the system generates an error value.

10. The system according to claim 3, wherein:
the first logic circuit is configured to perform the XOR combinational logic function based on three bits of the first data packet; and the second logic circuit is configured to perform the XOR combinational logic function based on three bits of the second packet such as read from said one of the memory blocks;
the weight of said three bits of the first data packet corresponding to the respective weight of said three bits of the second data packet after reading.

11. The system according to claim 10, wherein the error correction code encoder and decoder are of double error correction, triple error detection (DECTED) type.

12. The system according to claim 1, wherein if the error correction code decoder detects three errors, then the memory system generates an error value.

13. The system according to claim 1, wherein the value of the addressing mode corresponds to one or an interleaved mode of data writing into said memory blocks or a linear mode of data writing into said memory blocks.

14. The system according to claim 1, wherein the first data packet further comprises the data element to be written.

15. A method of securing a memory system that includes a memory comprising memory blocks, the method comprising:
first logically combining with an XOR combinational logic function a current value of a data addressing mode and at least one bit of a first data packet comprising one of: an error correction code of a data element to be written; said data element to be written; or a combination of said error correction code of a data element to be written and said data element to be written;
storing a second data packet generated by said first logically combining into one of the memory blocks;
second logically combining with an XOR combinational logic function at least one bit of the second packet such as read from said one of the memory blocks, and the current value of the addressing mode during the reading of the second packet or subsequently thereto;
wherein a weight of said at least one bit of the first data packet corresponds to a weight of said at least one bit of the second read data packet.

16. The method according to claim 15, further comprising decoding with an error correction code a third data packet resulting from the second logic circuit.

17. The method according to claim 16, further comprising encoding to calculate said error correction code associated with said data element to be written.

18. The method according to claim 17, wherein:
the first logically combining performs the XOR combinational logic function based on a bit of the first data packet; and
the second logical combining performs the XOR combinational logic function based on a bit of the second packet such as read from said one of the memory blocks.

19. The method according to claim 17, wherein:
the first logically combining performs the XOR combinational logic function based on two bits of the first data packet; and
the second logical combining performs the XOR combinational logic function based on two bits of the second packet such as read from said one of the memory blocks;
wherein the weight of said two bits of the first data packet corresponds to the respective weight of said two bits of the second data packet after reading.

20. The method according to claim 17, wherein:

the first logically combining performs the XOR combinational logic function based on three bits of the first data packet; and the second logical combining performs the XOR combinational logic function based on three bits of the second packet such as read from said one of the memory blocks;

wherein the weight of said three bits of the first data packet corresponds to the respective weight of said three bits of the second data packet after reading.

21. The method according to claim 15, wherein the value of the addressing mode corresponds to one of an interleaved mode of data writing into said memory blocks or a linear mode of data writing into said memory blocks.

22. The method according to claim 15, wherein the first data packet further comprises the data element to be written.

\* \* \* \* \*